US012689959B2

(12) United States Patent
Zheng et al.

(10) Patent No.: US 12,689,959 B2
(45) Date of Patent: Jul. 21, 2026

(54) CELL RESELECTION METHOD AND APPARATUS

(71) Applicant: HUAWEI TECHNOLOGIES CO., LTD., Shenzhen (CN)

(72) Inventors: Wuyang Zheng, Shenzhen (CN); Tingting Geng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 18/589,945

(22) Filed: Feb. 28, 2024

(65) Prior Publication Data

US 2024/0205776 A1 Jun. 20, 2024

Related U.S. Application Data

(63) Continuation of application No. PCT/CN2022/114338, filed on Aug. 23, 2022.

(30) Foreign Application Priority Data

Aug. 31, 2021 (CN) .......................... 202111012996.4

(51) Int. Cl.
*H04W 36/00* (2009.01)
*H04W 36/24* (2009.01)
*H04W 36/08* (2009.01)

(52) U.S. Cl.
CPC ....... *H04W 36/24* (2013.01); *H04W 36/0055* (2013.01); *H04W 36/083* (2023.05)

(58) Field of Classification Search
CPC ............. H04W 12/009; H04W 12/122; H04W 36/0055; H04W 36/08; H04W 36/083;
(Continued)

(56) References Cited

U.S. PATENT DOCUMENTS

2014/0148169 A1 5/2014 Li et al.
2016/0374006 A1* 12/2016 Chen ..................... H04W 24/10
(Continued)

FOREIGN PATENT DOCUMENTS

CN 102238751 A 11/2011
EP 2696641 A1 2/2014

OTHER PUBLICATIONS

3GPP TS 38.300 V16.3.0 (Sep. 2020), 3rd Generation Partnership Project; Technical Specification Group Radio Access Network; NR; NR and NG-RAN Overall Description; Stage 2 (Release 16), total 148 pages.

(Continued)

*Primary Examiner* — Robert J Lopata
(74) *Attorney, Agent, or Firm* — Rimon PC

(57) ABSTRACT

This application provides a cell reselection method and an apparatus. A terminal device sends a radio resource control (RRC) setup request message to a first radio access network device a plurality of times. The terminal device receives a response message for the RRC setup request message within a preset time. The terminal device determines, based on a first preset threshold and a quantity of consecutive times that the response message is not received, whether to perform cell reselection, or the terminal device determines, based on a third preset threshold and a quantity of times that the RRC setup request message is sent or a quantity of times that the response message for the RRC setup request message is received, whether to trigger a cell reselection mechanism.

20 Claims, 5 Drawing Sheets

(58) Field of Classification Search
     CPC ..... H04W 36/24; H04W 48/02; H04W 48/20;
                                        H04W 76/18
     See application file for complete search history.

(56)                    References Cited

U.S. PATENT DOCUMENTS

| | | | |
|---|---|---|---|
| 2018/0199385 | A1* | 7/2018 | Ramkull ............... H04W 36/08 |
| 2019/0028905 | A1* | 1/2019 | Veeramallu ............ H04W 4/70 |
| 2020/0084818 | A1 | 3/2020 | Xu et al. |
| 2021/0211917 | A1 | 7/2021 | Kunz et al. |
| 2022/0095177 | A1* | 3/2022 | Han ................... H04W 36/0079 |
| 2022/0104095 | A1* | 3/2022 | Han ...................... H04W 36/26 |
| 2024/0056954 | A1* | 2/2024 | Xu ......................... H04W 76/20 |
| 2025/0142645 | A1* | 5/2025 | Back .................... H04W 76/20 |

OTHER PUBLICATIONS

3GPP TS 38.331 V16.6.0 (Sep. 2021), 3rd Generation Partnership
Project; Technical Specification Group Radio Access Network; NR;
Radio Resource Control (RRC) protocol specification (Release 16),
total 961 pages.

* cited by examiner

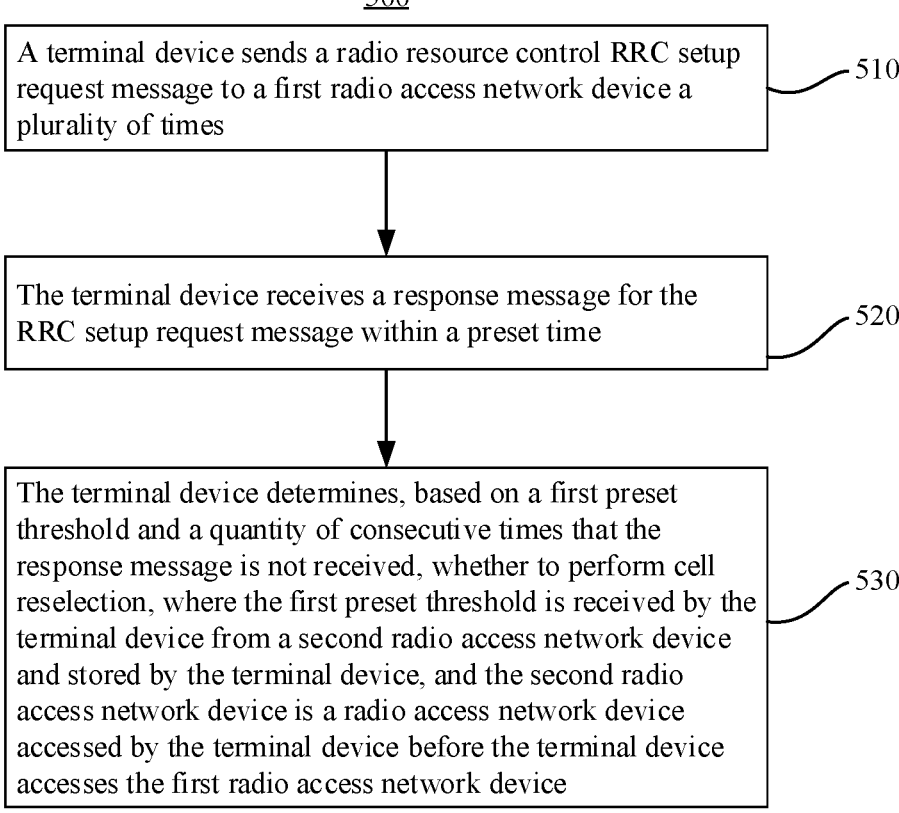

500

A terminal device sends a radio resource control RRC setup request message to a first radio access network device a plurality of times — 510

The terminal device receives a response message for the RRC setup request message within a preset time — 520

The terminal device determines, based on a first preset threshold and a quantity of consecutive times that the response message is not received, whether to perform cell reselection, where the first preset threshold is received by the terminal device from a second radio access network device and stored by the terminal device, and the second radio access network device is a radio access network device accessed by the terminal device before the terminal device accesses the first radio access network device — 530

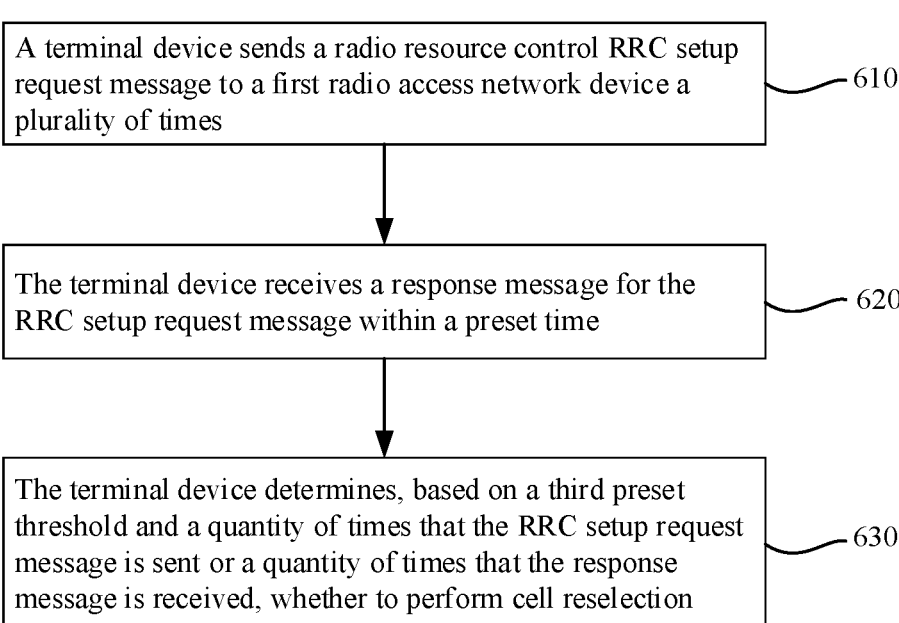

A terminal device sends a radio resource control RRC setup request message to a first radio access network device a plurality of times — 610

The terminal device receives a response message for the RRC setup request message within a preset time — 620

The terminal device determines, based on a third preset threshold and a quantity of times that the RRC setup request message is sent or a quantity of times that the response message is received, whether to perform cell reselection — 630

FIG. 6

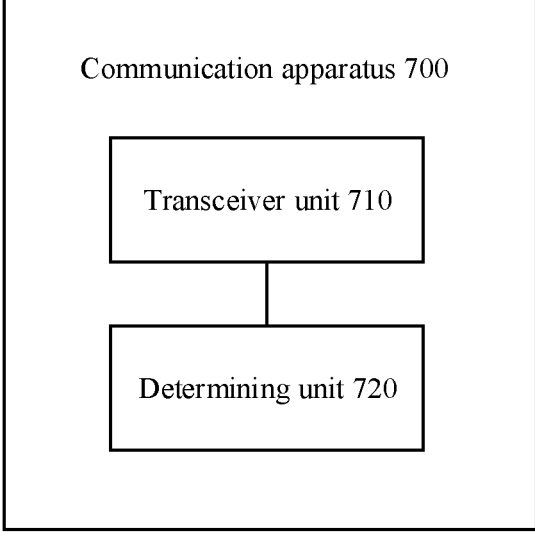

Communication apparatus 700

Transceiver unit 710

Determining unit 720

FIG. 7

CELL RESELECTION METHOD AND APPARATUS

CROSS-REFERENCE TO RELATED APPLICATIONS

This application is a continuation of International Application No. PCT/CN2022/114338, filed on Aug. 23, 2022, which claims priority to Chinese Patent Application No. 202111012996.4, filed on Aug. 31, 2021. The disclosures of the aforementioned applications are hereby incorporated by reference in their entireties.

TECHNICAL FIELD

This application relates to the communication field, and more specifically, to a cell reselection method and an apparatus.

BACKGROUND

A fake base station can transmit a high-power signal to cause user equipment (UE) in a radio resource control idle (RRC_IDLE) state to camp on a fake cell controlled by the fake base station, affecting normal service transmission of the UE.

Currently, UE determines, based on connection establishment failure control (ConnEstFailureControl) information in a system information block 1 (SIB1), how to trigger cell reselection and reselect to another cell when RRC connection establishment of the UE fails. After sending an RRC setup request message, the UE starts a timer T300. If the UE does not receive an RRC setup message or an RRC reject message from a network device when T300 expires, the UE determines that current RRC establishment fails. The UE continues sending an RRC setup request message to the network device, and repeats the foregoing operations. If the SIB1 includes connection establishment failure count (connEstFailCount) information, and a quantity of a T300 record increases by 1 each time T300 expires on a same cell, when the quantity of a T300 record reaches or exceeds a quantity that is defined in connEstFailCount, the UE considers that RRC connection establishment fails, and determines whether the cell fulfills an S criterion. If the cell does not fulfill the S criterion, cell reselection starts. If the UE receives an RRC setup message from a serving cell after sending the RRC setup request message, the quantity of a T300 record does not increase even without subsequent behaviors such as authentication and security mode activation. In addition, after receiving a new SIB1, the UE deletes the original SIB1.

The fake base station transmits a high-power signal to suppress a legitimate base station. In this case, a SIB1 sent by the fake base station may not include the ConnEstFailureControl information, to attract the UE as far as possible to camp on the fake cell. After receiving the SIB1 sent by the fake base station, the UE deletes a previously stored SIB1. Consequently, the UE cannot determine, based on connEstFailCount in the ConnEstFailureControl information, whether the quantity of times that T300 expires exceeds a preset threshold. As a result, the UE cannot perform normal communication and cannot reselect to a normal cell (a legitimate cell). Alternatively, the fake base station sends the ConnEstFailureControl information, but the fake base station responds to the RRC setup request message sent by the UE and does not perform a subsequent operation after the responding. For example, the fake base station does not perform subsequent behaviors such as authentication and security mode activation after sending the RRC setup message. Therefore, the UE cannot truly establish a communication link to the fake base station. Because the quantity of times that T300 expires keeps not exceeding the quantity that is defined in connEstFailCount, the UE cannot trigger a subsequent cell reselection mechanism. As a result, the UE camps on the fake cell for a long time, cannot perform normal communication, and cannot reselect to another cell. This affects a communication service of the UE.

SUMMARY

This application provides a cell reselection method and an apparatus, to avoid a case in which service transmission is affected because a terminal device camps on a fake cell for a long time.

According to a first aspect, a cell reselection method is provided. The method may be performed by a terminal device, or a chip or a chip system on a terminal side. The method includes: The terminal device sends a radio resource control RRC setup request message to a first radio access network device a plurality of times. The terminal device receives a response message for the RRC setup request message within a preset time. The terminal device determines, based on a first preset threshold and a quantity of consecutive times that the response message is not received, whether to perform cell reselection, where the first preset threshold is received by the terminal device from a second radio access network device and stored by the terminal device, and the second radio access network device is a radio access network device accessed by the terminal device before the terminal device accesses the first radio access network device.

Based on the foregoing technical solution, because the currently accessed first radio access network device does not send ConnEstFailureControl information to the terminal device, the terminal device stores ConnEstFailureControl information (first configuration information) sent by a previously accessed radio access network device, and determines, based on connEstFailCount (the first preset threshold) in the stored ConnEstFailureControl information, whether RRC setup fails and whether to perform cell reselection. If the quantity of consecutive times that the response message for the RRC setup request message is not received is greater than or equal to the first preset threshold, the terminal device may be directly triggered to perform cell reselection, or the terminal device may be triggered, depending on whether a cell on which the terminal device currently camps fulfills an S criterion, to perform cell reselection to access a legitimate cell. In this way, a case in which service transmission is affected because the terminal device camps on a fake cell for a long time is avoided.

With reference to the first aspect, in some implementations of the first aspect, the terminal device does not receive second configuration information from the first radio access network device, and the second configuration information is used to determine whether to perform cell reselection.

With reference to the first aspect, in some implementations of the first aspect, that the terminal device determines, based on a first preset threshold and a quantity of consecutive times that the response message is not received, whether to perform cell reselection includes: If the quantity of consecutive times that the response message is not received is greater than or equal to the first preset threshold, the terminal device determines, depending on whether a first cell controlled by the first radio access network device fulfills a first criterion, whether to perform cell reselection. If the quantity of consecutive times that the response message is not received is less than the first preset threshold, the terminal device determines not to perform cell reselection.

With reference to the first aspect, in some implementations of the first aspect, that the terminal device determines, depending on whether a first cell controlled by the first radio access network device fulfills a first criterion, whether to perform cell reselection includes: The terminal device determines, based on the first configuration information, whether the first cell fulfills the first criterion, where the first configuration information is received by the terminal device from the second radio access network device and stored by the terminal device, and the first configuration information includes a first offset and a validity period of the first offset. If the first cell fulfills the first criterion, the terminal device decreases a priority of the first cell and/or increases the first offset. When the priority of the first cell is lower than a second preset threshold and/or the first cell does not fulfill the first criterion, the terminal device determines to perform cell reselection.

With reference to the first aspect, in some implementations of the first aspect, the first criterion includes the S criterion, and the first offset is an offset temporarily applied in the S criterion.

With reference to the first aspect, in some implementations of the first aspect, that the terminal device determines, based on a first preset threshold and a quantity of consecutive times that the response message is not received, whether to perform cell reselection includes: If the quantity of consecutive times that the response message is not received is greater than or equal to the first preset threshold, the terminal device determines to perform cell reselection. If the quantity of consecutive times that the response message is not received is less than the first preset threshold, the terminal device determines not to perform cell reselection.

With reference to the first aspect, in some implementations of the first aspect, the method further includes: The terminal device excludes the first cell from a candidate cell in a process of performing cell reselection.

According to a second aspect, a cell reselection method is provided. The method may be performed by a terminal device, or a chip or a chip system on a terminal side. The method includes: The terminal device sends a radio resource control RRC setup request message to a first radio access network device a plurality of times. The terminal device receives a response message for the RRC setup request message within a preset time. The terminal device determines, based on a third preset threshold and a quantity of times that the RRC setup request message is sent or a quantity of times that the response message is received, whether to perform cell reselection.

Based on the foregoing technical solution, because the currently accessed first radio access network device replies to the RRC setup request message with an RRC setup message or an RRC reject message, and therefore a quantity of consecutive times that the response message for the RRC setup request message is not received does not exceed a fourth preset threshold, the terminal device determines, based on the third preset threshold and the cumulative quantity of times that the RRC setup request message is sent or the cumulative quantity of times that the response message is received, whether RRC setup fails and whether to perform cell reselection. If the quantity of times that the RRC setup request message is sent or the quantity of times that the response message is received is greater than or equal to the third preset threshold, the terminal device may be directly triggered to perform cell reselection, or the terminal device may be triggered, depending on whether a cell on which the terminal device currently camps fulfills an S criterion, to perform cell reselection to access a legitimate cell. In this way, a case in which service transmission is affected because the terminal device camps on a fake cell for a long time is avoided.

With reference to the second aspect, in some implementations of the second aspect, the third preset threshold is predefined in a protocol, or the third preset threshold is determined by the terminal device, or the third preset threshold is received by the terminal device from the first radio access network device or a second radio access network device, where the second radio access network device is a radio access network device accessed by the terminal device before the terminal device accesses the first radio access network device.

With reference to the second aspect, in some implementations of the second aspect, that the terminal device determines, based on a third preset threshold and a quantity of times that the RRC setup request message is sent or a quantity of times that the response message is received, whether to perform cell reselection includes: If the quantity of times that the RRC setup request message is sent or the quantity of times that the response message is received is greater than or equal to the third preset threshold, the terminal device determines, depending on whether a first cell controlled by the first radio access network device fulfills a first criterion, whether to perform cell reselection. If the quantity of times that the RRC setup request message is sent or the quantity of times that the response message is received is less than the third preset threshold, the terminal device determines not to perform cell reselection.

With reference to the second aspect, in some implementations of the second aspect, that the terminal device determines, depending on whether a first cell controlled by the first radio access network device fulfills a first criterion, whether to perform cell reselection includes: The terminal device determines, based on second configuration information, whether the first cell fulfills the first criterion, where the second configuration information is received by the terminal device from the first radio access network device, and the second configuration information includes a second offset and a validity period of the second offset. If the first cell fulfills the first criterion, the terminal device decreases a priority of the first cell and/or increases the second offset. When the priority of the first cell is lower than the second preset threshold and/or the first cell does not fulfill the first criterion, the terminal device determines to perform cell reselection.

With reference to the second aspect, in some implementations of the second aspect, the first criterion includes an S criterion, and the second offset is an offset temporarily applied in the S criterion.

With reference to the second aspect, in some implementations of the second aspect, that the terminal device determines, based on a third preset threshold and a quantity of times that the RRC setup request message is sent or a quantity of times that the response message is received, whether to perform cell reselection includes: If the quantity of times that the RRC setup request message is sent or the quantity of times that the response message is received is greater than or equal to the third preset threshold, the terminal device determines to perform cell reselection. If the quantity of times that the RRC setup request message is sent or the quantity of times that the response message is received is less than the third preset threshold, the terminal device determines not to perform cell reselection.

With reference to the second aspect, in some implementations of the second aspect, the method further includes: The terminal device excludes the first cell from a candidate cell in a process of performing cell reselection.

With reference to the second aspect, in some implementations of the second aspect, the response message includes an RRC setup message and/or an RRC reject message.

According to a third aspect, a communication apparatus is provided, including: a transceiver unit, configured to send a radio resource control RRC setup request message to a first radio access network device a plurality of times, where the transceiver unit is further configured to receive a response message for the RRC setup request message within a preset time; and a determining unit, configured to determine, based on a first preset threshold and a quantity of consecutive times that the response message is not received, whether to perform cell reselection, where the first preset threshold is received by the terminal device from a second radio access network device and stored by the terminal device, and the second radio access network device is a radio access network device accessed by the terminal device before the terminal device accesses the first radio access network device.

With reference to the third aspect, in some implementations of the third aspect, the transceiver unit does not receive second configuration information from the first radio access network device, and the second configuration information is used to determine whether to perform cell reselection.

With reference to the third aspect, in some implementations of the third aspect, the determining unit is configured to: if the quantity of consecutive times that the response message is not received is greater than or equal to the first preset threshold, determine, depending on whether a first cell controlled by the first radio access network device fulfills a first criterion, whether to perform cell reselection; or if the quantity of consecutive times that the response message is not received is less than the first preset threshold, determine not to perform cell reselection.

With reference to the third aspect, in some implementations of the third aspect, the determining unit is configured to: determine, based on first configuration information, whether the first cell fulfills the first criterion, where the first configuration information is received by the transceiver unit from the second radio access network device and stored by the transceiver unit, and the first configuration information includes a first offset and a validity period of the first offset; if the first cell fulfills the first criterion, decrease a priority of the first cell and/or increase the first offset; and when the priority of the first cell is lower than a second preset threshold and/or the first cell does not fulfill the first criterion, determine to perform cell reselection.

With reference to the third aspect, in some implementations of the third aspect, the first criterion includes an S criterion, and the first offset is an offset temporarily applied in the S criterion.

With reference to the third aspect, in some implementations of the third aspect, the determining unit is configured to: if the quantity of consecutive times that the response message is not received is greater than or equal to the first preset threshold, determine to perform cell reselection; or if the quantity of consecutive times that the response message is not received is less than the first preset threshold, determine not to perform cell reselection.

With reference to the third aspect, in some implementations of the third aspect, the determining unit is further configured to exclude the first cell from a candidate cell in a process of performing cell reselection.

According to a fourth aspect, a communication apparatus is provided, including: a transceiver unit, configured to send a radio resource control RRC setup request message to a first radio access network device a plurality of times, where the transceiver unit is further configured to receive a response message for the RRC setup request message within a preset time; and a determining unit, configured to determine, based on a third preset threshold and a quantity of times that the RRC setup request message is sent or a quantity of times that the response message is received, whether to perform cell reselection.

With reference to the fourth aspect, in some implementations of the fourth aspect, the third preset threshold is predefined in a protocol, or the third preset threshold is determined by the terminal device, or the third preset threshold is received by the terminal device from the first radio access network device or a second radio access network device, where the second radio access network device is a radio access network device accessed by the terminal device before the terminal device accesses the first radio access network device.

With reference to the fourth aspect, in some implementations of the fourth aspect, the determining unit is configured to: if the quantity of times that the RRC setup request message is sent or the quantity of times that the response message is received is greater than or equal to the third preset threshold, determine, depending on whether a first cell controlled by the first radio access network device fulfills a first criterion, whether to perform cell reselection; or if the quantity of times that the RRC setup request message is sent or the quantity of times that the response message is received is less than the third preset threshold, determine not to perform cell reselection.

With reference to the fourth aspect, in some implementations of the fourth aspect, the determining unit is configured to: determine, based on second configuration information, whether the first cell fulfills the first criterion, where the second configuration information is received by the transceiver unit from the first radio access network device, and the second configuration information includes a second offset and a validity period of the second offset; if the first cell fulfills the first criterion, decrease a priority of the first cell and/or increase the second offset; and when the priority of the first cell is lower than the second preset threshold and/or the first cell does not fulfill the first criterion, determine to perform cell reselection.

With reference to the fourth aspect, in some implementations of the fourth aspect, the first criterion includes an S criterion, and the second offset is an offset temporarily applied in the S criterion.

With reference to the fourth aspect, in some implementations of the fourth aspect, the determining unit is configured to: if the quantity of times that the RRC setup request message is sent or the quantity of times that the response message is received is greater than or equal to the third preset threshold, determine to perform cell reselection; or if the quantity of times that the RRC setup request message is sent or the quantity of times that the response message is received is less than the third preset threshold, determine not to perform cell reselection.

With reference to the fourth aspect, in some implementations of the fourth aspect, the determining unit is further configured to exclude the first cell from a candidate cell in a process of performing cell reselection.

With reference to the fourth aspect, in some implementations of the fourth aspect, the response message includes an RRC setup message and/or an RRC reject message.

According to a fifth aspect, a communication device is provided, including a processor and a transceiver, where the transceiver is configured to receive computer code or instructions, and transmit the computer code or the instructions to the processor, and the processor runs the computer code or the instructions, to implement the cell reselection method according to any one of the first aspect or the possible implementations of the first aspect.

According to a sixth aspect, a communication device is provided, including a processor and a transceiver, where the transceiver is configured to receive computer code or instructions, and transmit the computer code or the instructions to the processor, and the processor runs the computer code or the instructions, to implement the cell reselection method according to any one of the second aspect or the possible implementations of the second aspect.

According to a seventh aspect, a computer-readable storage medium is provided, where the computer-readable storage medium stores a computer program, and when the computer program is executed by a communication apparatus, the communication apparatus is enabled to implement the cell reselection method according to any one of the first aspect or the possible implementations of the first aspect.

According to an eighth aspect, a computer program product including instructions is provided, where when the instructions are executed by a communication apparatus, the communication apparatus is enabled to implement the cell reselection method according to any one of the first aspect or the possible implementations of the first aspect.

BRIEF DESCRIPTION OF DRAWINGS

FIG. 5 is a schematic flowchart of a cell reselection method according to some embodiments of this application;

FIG. 6 is a schematic flowchart of another cell reselection method according to some embodiments of this application;

FIG. 7 is a schematic block diagram of a communication apparatus according to some embodiments of this application;

DESCRIPTION OF EMBODIMENTS

Figures 1, 2:
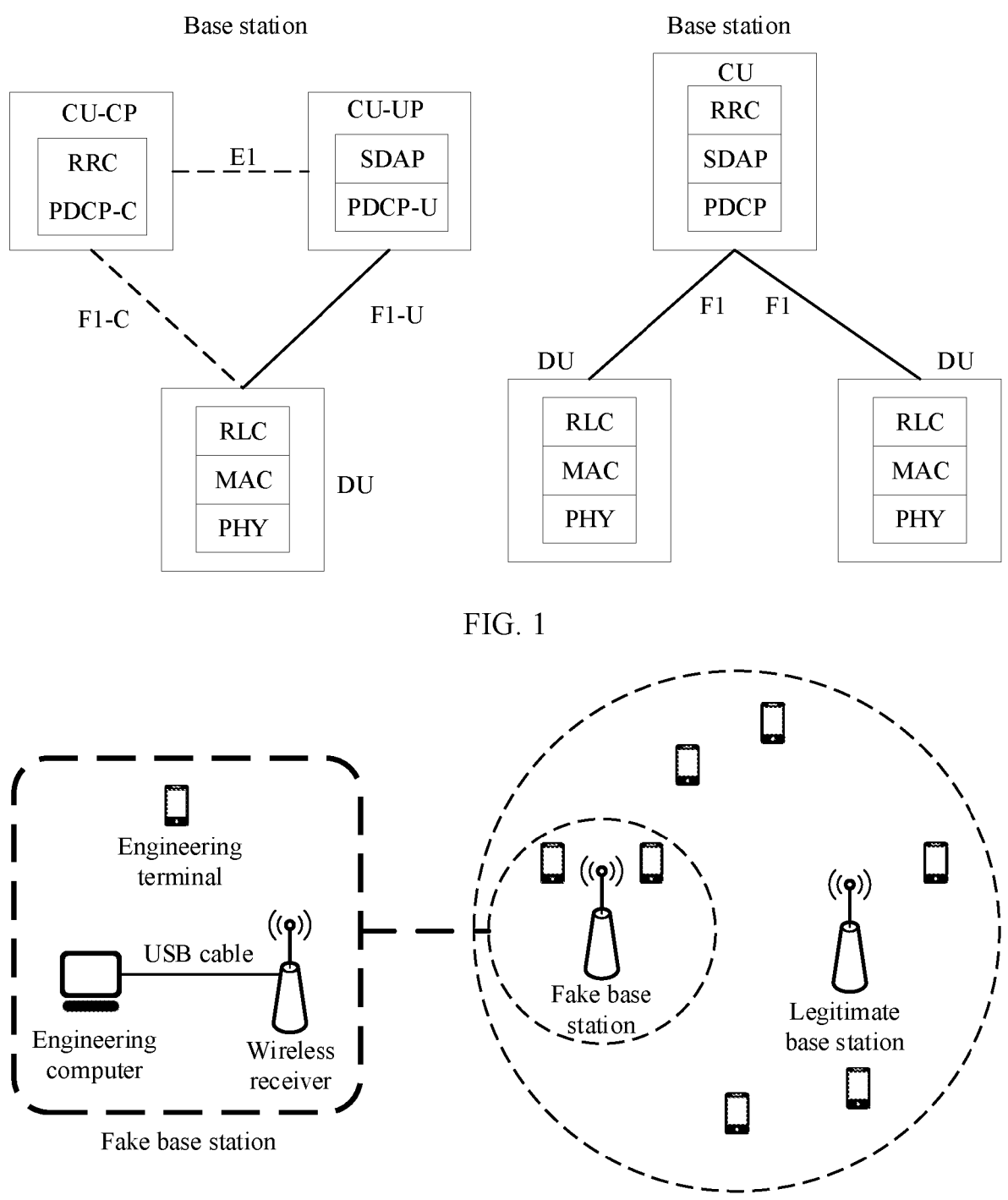
FIG. 1 is a schematic diagram of an NR protocol stack and a network element module on a base station side.
FIG. 2 is a conceptual diagram of a fake base station.

The following describes technical solutions of this application with reference to the accompanying drawings.

Embodiments of this application may be applied to various communication systems, such as a wireless local area network (WLAN) system, a narrowband-internet of things (NB-IoT) system, a global system for mobile communications (GSM), an enhanced data rate GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, a satellite communication system, a 5th generation (5G) system, a non-terrestrial network (NTN) system, or a new communication system that is to emerge in the future.

A communication system that can be used in this application includes one or more transmit ends and one or more receive ends. Signal transmission between the transmit end and the receive end may be performed through a radio wave, or may be performed through transmission media such as visible light, laser, infrared, and an optical fiber.

For example, one of the transmit end and the receive end may be a terminal device, and the other may be a network device. For example, both the transmit end and the receive end may be terminal devices.

The terminal device in embodiments of this application may include various handheld devices, vehicle-mounted devices, wearable devices, or computing devices that have a wireless communication function, or another processing device connected to a wireless modem. The terminal device may be deployed on land, including indoors or outdoors, and handheld or vehicle-mounted, or may be deployed on water (for example, on a ship), or may be deployed in the air (for example, on an airplane, a balloon, or a satellite). The terminal device may be a mobile phone, a tablet computer (pad), a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal in transportation safety, a wireless terminal device in smart city, or a wireless terminal in smart home. The terminal device may alternatively be a mobile station (MS), a subscriber unit, user equipment (UE), a cellular phone, a smartphone, a wireless data card, a personal digital assistant (PDA) computer, a tablet computer, a wireless modem, a handset, a laptop computer, a machine type communication (MTC) terminal, or the like.

The network device is a device in a wireless network, for example, a radio access network (RAN) node that connects the terminal device to the wireless network. Currently, examples of some RAN nodes are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a base band unit (BBU), a wireless fidelity (Wi-Fi) access point (AP), or integrated access and backhaul (IAB) node, or the like. In a network structure, the network device may include a central unit (CU) node, a distributed unit (DU) node, or a RAN device including a CU node and a DU node. In a network structure, the central unit CU node may be divided into a control plane (CU-CP) and a user plane (CU-UP). The CU-CP is responsible for a control plane function, and mainly includes radio resource control (RRC) and a packet data convergence protocol (PDCP)-C. The PDCP-C is mainly responsible for encryption and decryption, integrity protection, data transmission, and the like of control plane data. The CU-UP is responsible for a user plane function, and mainly includes a service data adaptation protocol (SDAP) and a PDCP-U. The SDAP is mainly responsible for processing data of a core network and mapping a flow to a bearer. The PDCP-U is responsible for encryption and decryption, integrity protection, header compression, sequence number maintenance, data transmission, and the like of user plane data. The CU-CP and the CU-UP are connected through an E1 interface. The CU-CP indicates that a CU is connected to the core network through an Ng interface and connected to a DU through F1-C (the control plane). The CU-UP is connected to the DU through F1-U (the user plane). Certainly, in another possible implementation, the PDCP-C is alternatively in the CU-UP.

FIG. 1 is a schematic diagram of an NR protocol stack and a network element module on a base station side.

To facilitate understanding of embodiments of this application, conventional technologies related to embodiments of this application are briefly described.

1. Concept of a Fake Base Station

Generally, a fake base station includes a simple wireless device and dedicated open-source software. The fake base station can perform sending at high power to suppress a legitimate base station (the real base station), so that UE is attracted to camp on the fake base station and receive a signal from the fake base station. The fake base station aims to interfere with a normal service of the UE. Therefore, the fake base station generally expects the UE to keep camping on a cell served by the fake base station. The fake base station can, by simulating the legitimate base station (a target base station), send signaling to a target terminal according to a related protocol and obtain related information of the target terminal. FIG. 2 is a conceptual diagram of a fake base station. Within coverage of the legitimate base station, the fake base station can force the target terminal to perform cell reselection, a location update, and a handover, to perform network fraud, obtain private information, and the like. One fake base station can serve a plurality of fake cells.

2. RRC State Transition

Figure 3:
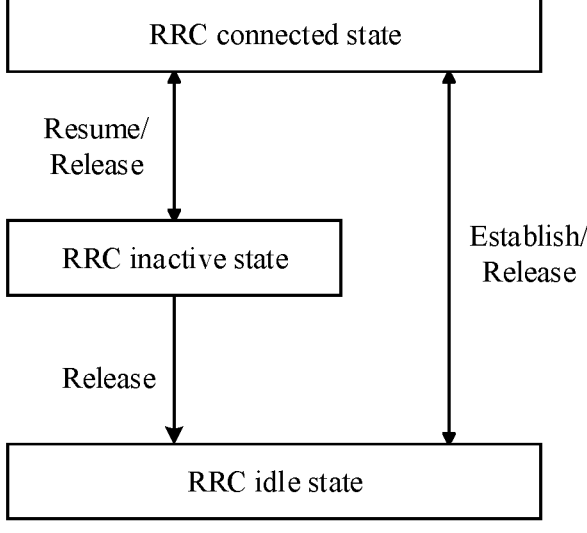
FIG. 3 is a schematic diagram of transition between three states of UE.

In new radio (NR), there are three types of RRC states for UE: an RRC_IDLE state, an RRC non-active state or an RRC inactive (RRC_INACTIVE) state, and an RRC connected (RRC_CONNECTED) state. When the UE is in the RRC_CONNECTED state, a link between the UE and a base station and a link between the UE and a core network are already established. When data arrives at the network, the data can be directly transmitted to the UE. When the UE is in the RRC_INACTIVE state, it is indicated that a link between the UE and the base station and a link between the UE and the core network are previously established, but the link between the UE and the base station is released. Although the link is released, the base station stores context of the UE. When there is data to be transmitted, the base station can quickly resume the link. When the UE is in the RRC_IDLE state, there is no link between the UE and the base station or between the UE and the network. When there is data to be transmitted, a link between the UE and the base station and a link between the UE and the core network needs to be established. FIG. 3 is a schematic diagram of transition between three states of UE.

3. System Information (SI) and On-Demand System Information (OSI)

System information is a message sent by a base station to UE. In an NR system, the system information is classified into minimum SI and other SI. The minimum SI includes a master information block (MIB) and an SIB1. The minimum SI is periodically sent. The SIB1 may also be referred to as remaining minimum system information (RMSI), namely, minimum SI other than the MIB. The MSI generally includes scheduling information of the other SI, and a system message that includes cell selection information and initial access information. All system information except the MIB and the SIB1 may be referred to as other SI. The other SI is transmitted in a SystemInformation message, SIB2. To save power of the base station, the other SI is not periodically sent, but is sent based on a request. The other SI is referred to as OSI.

UE in an idle state or in an inactive state may learn, through indication in the SIB1, what pieces of SI are sent by the base station. If the pieces of SI sent by the base station do not include SI that the UE wants, the UE may indicate, based on a configuration of a network by using a msg1/msg3/RRC message, OSI requested for transmission. After receiving the request for the OSI, the network sends the OSI to the UE. A sending mechanism of the OSI may be any one of a unicast, a groupcast, and a broadcast.

4. ConnEstFailureControl Information Element Explanation

Generally, when camping on a cell, UE in an idle state may periodically receive ConnEstFailureControl information element by using a SIB1 that is broadcast in the cell. The ConnEstFailureControl information element is used to configure a parameter for RRC connection establishment failure control. The connection establishment failure control information element includes the following content: a connEstFailCount, a connection establishment failure offset (connEstFailOffset) applied when the UE performs S criterion-based determining on a serving cell, and a time (connEstFailOffsetValidity) within which the UE applies the connection establishment failure offset. The connEstFailCount indicates a quantity of times that the UE detects T300 expiry on a same cell before the connEstFailOffset is applied. T300 starts timing when the UE sends an RRC setup request message, and stops timing after the UE receives an RRC setup message or an RRC reject message. That is, T300 is a timer for an RRC setup process. If no RRC setup message or RRC reject message is received within a time defined by T300, it is determined that current RRC setup fails. An offset temporarily applied ($Qoffset_{temp}$) corresponds to the connEstFailOffset defined in the ConnEstFailureControl, and is an offset for calculation. In addition, the connEstFailOffsetValidity defines a time within which the connEstFailOffset is used during S criterion-based determining. If the time defined by the connEstFailOffsetValidity elapses, connEstFailOffset is no longer included in calculation for the S criterion.

Figure 4:
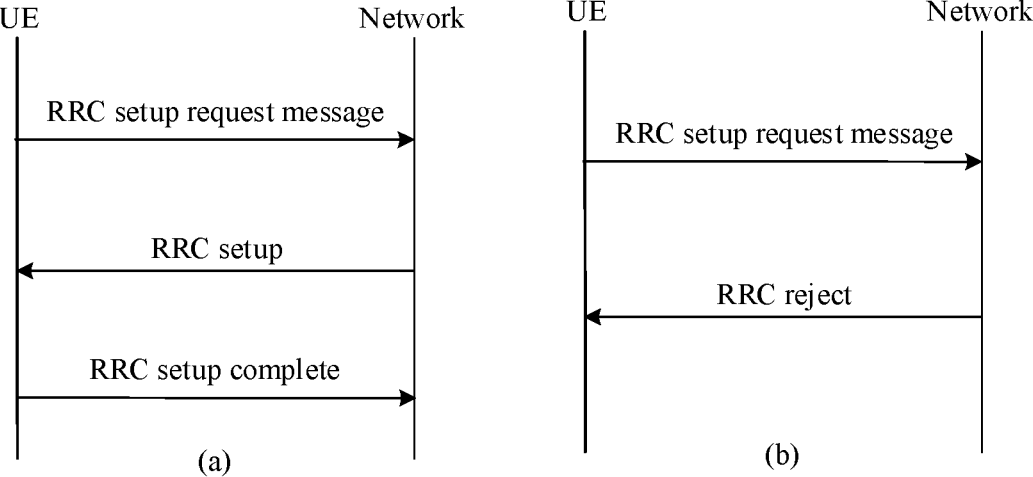
FIG. 4 is a schematic diagram of an RRC setup process/an RRC reject process.

(a) in FIG. 4 shows an RRC setup process, and (b) in FIG. 4 shows an RRC rejection process. If a quantity of consecutive times T300 expires on the same cell reaches or exceeds the quantity that is defined in the connEstFailCount, and the UE does not receive the RRC setup message or the RRC reject message yet, the UE triggers S criterion-based determining of the serving cell.

When the serving cell satisfies both Formula (1) and Formula (2), the serving cell fulfills the S criterion:

$$S_{rxlev} = \tag{1}$$

$$Q_{rxlevmeas} - (Q_{rxlevmin} + Q_{rxlevminoffset}) - P_{compensation} - Qoffset_{temp} > 0$$

$$S_{qual} = Q_{qualmeas} - (Q_{qualmin} + Q_{qualminoffset}) - Qoffset_{temp} > 0 \tag{2}$$

$S_{rxlev}$ represents a level value decibel (dB) obtained through calculation during cell selection or cell reselection. $Q_{rxlevmeas}$ represents a reference signal received power (RSRP) decibel milliwatts (dBm) of a candidate cell. $Q_{rxlevmin}$ and $Q_{rxlevminoffset}$ each represent a minimum receive level for cell camping configured in a system information block (SIB). $Q_{rxlevminoffset}$ is valid only when a cell is evaluated for cell selection as a result of a periodic search for a high-priority PLMN while the UE normally camps in a visited public land mobile network (VPLMN). This parameter applies an offset to $Q_{rxlevmin}$. $P_{compensation}$ represents a larger value between 0 and a difference obtained by subtracting a maximum radio frequency output power PUMAX that is of UE and that is specified based on a UE class from a maximum allowed uplink transmit power PEMAX of UE, that is, MAX(PEMAX−PUMAX, 0). $Q_{qualmin}$ represents minimum quality level required in a cell. $Q_{qualmeas}$ represents measured cell quality value, Reference Signal Received Quality (RSRQ). $Q_{qualminoffset}$ is similar to $Q_{rxlevminoffset}$, and represents an offset used for $S_{qual}$ evaluation as a result of a periodic search for a higher-priority PLMN while the UE normally camps in a VPLMN.

If S values ($S_{rxlev}$ and $S_{qual}$) of a cell are both greater than 0, it is indicated that the cell fulfills the S criterion and the cell is a suitable cell or a cell suitable for camping on. A purpose of RRC setup is to establish an RRC signaling connection between the UE and a network. After the connection is established, control signaling can be transmitted between the UE and the network.

For inactive UE, if the UE does not receive an RRC resume message within a specified time after sending an RRC resume request message, it is considered that RRC resume fails. A subsequent procedure for RRC resume failure is the same as a subsequent procedure for RRC setup failure. The UE performs S criterion-based determining, and decides, based on a result of S criterion-based determining, whether to perform cell reselection.

5. Cell Selection

When UE is powered on, or radio link failure or the like occurs, the UE performs a cell search process and selects a suitable cell as soon as possible to camp on. This process is referred to as cell selection. In the cell search process, the UE reads system information of the cell and obtains parameters such as $Q_{rxlevmeas}$, $Q_{rxlevmin}$, and $Q_{rxlevminoffset}$. Then, the UE evaluates whether the cell is a suitable cell based on an S criterion. Once a suitable cell that fulfills the S criterion is found, the UE accesses the cell. If the cell is not a suitable cell, the UE continues searching until the UE finds a suitable cell and camps on the cell.

6. Cell Reselection

After UE in an idle state camps on a cell, as the UE moves or another cell satisfies a trigger condition of cell reselection, the UE may need to switch to another cell of a higher priority or another cell with better signal quality for camping on. This is a cell reselection process.

Cell selection is a process of finding a suitable cell as soon as possible, while cell reselection is a process of selecting a more suitable cell. To save UE power, a protocol defines the following measurement criteria:

(1) For a frequency layer or system whose priority is higher than a priority of a current serving cell, the UE constantly measures information, such as cell quality and beam quality, of the frequency layer or system.

(2) If $S_{rxlev}$ of the current serving cell is less than or equal to $S_{intrasearch}$, the UE starts measurement on an intra-frequency cell, where $S_{intrasearch}$ includes $S_{intrasearchP}$ and $S_{intrasearchQ}$, and $S_{intrasearch}$ is a parameter configured by a network device and sent to the UE through the system information, and is used by the UE to determine when to perform measurement on the intra-frequency cell. When $S_{rxlev}$ is less than or equal to $S_{intrasearchP}$, and $S_{qual}$ is less than or equal to $S_{intrasearchQ}$, the UE starts intra-frequency measurement. When $S_{rxlev}$ is greater than $S_{intrasearchP}$, and $S_{qual}$ is greater than $S_{intrasearchQ}$, the UE may perform intra-frequency measurement or may not perform measurement on a neighboring cell. This is not specifically limited.

(3) If $S_{rxlev}$ of the current serving cell is less than or equal to $S_{nonintrasearch}$, or $S_{nonintrasearch}$ is not configured, the UE starts measurement of an equal priority frequency or measurement of a low priority frequency and system.

After measurement, the UE determines whether to reselect away from the cell to a new cell. Reselection criteria are as follows:

(1) Reselection criterion for a high priority frequency or system: If the UE determines through measurement that $S_{rxlev}$ of another cell is greater than $Thresh_{x,\ high}$ during a time longer than a time defined by $Treselection_{RAT}$, cell reselection is triggered, where $Thresh_{x,\ high}$ is configured by the network device, and defines an $S_{rxlev}$ threshold used by the UE on a target cell of a radio access technology (RAT) or frequency band whose priority is higher than a priority of a radio access technology or frequency of the current serving cell during cell reselection to the target cell.

(2) Reselection criterion for a low priority frequency or system: If $S_{rxlev}$ of the current serving cell is less than $Thresh_{Serving,\ low}$ and $S_{rxlev}$ of another cell (a target cell) is greater than $Thresh_{x,\ low}$ during a time longer than a time defined by $Treselection_{RAT}$, cell reselection is triggered, where $Thresh_{Serving,\ low}$ is configured by the network device. For example, if the time defined by $Treselection_{RAT}$ is 50 ms, cell reselection can be triggered only when $S_{rxlev}$ is greater than $Thresh_{x,\ high}$ during a time longer than 50 ms. $Thresh_{Serving,\ low}$ defines an $S_{rxlev}$ threshold used by the UE on the serving cell when the UE reselects to a low priority radio access technology or frequency. $Thresh_{x,\ low}$ defines an $S_{rxlev}$ threshold used by the UE on a target cell of a radio access technology or frequency whose priority is lower than a priority of a radio access technology or frequency of the current serving cell during cell reselection to the target cell.

(3) Reselection criterion for an equal priority frequency or system: Cell reselection to a cell on an equal priority frequency is based on a ranking criterion of intra-frequency cell reselection. An intra-frequency cell reselection criterion is defined by Formula (3) and Formula (4), where $R_s$ is a ranking value of the current serving cell, and $R_n$ is a ranking value of a neighboring cell:

$$R_S = Q_{meas,s} + Q_{hyst} - Qoffset_{temp} \qquad (3)$$

$$R_n = Q_{meas,n} - Q_{offset} - Qoffset_{temp} \qquad (4)$$

$Q_{hyst}$ represents a hysteresis value used to prevent ping-pong reselection. $Q_{meas}$ represents received signal strength, of a cell, measured by the UE. For intra-frequency, a value of $Q_{offset}$ is $Q_{offsets,\ n}$. For inter-frequency, a value of $Q_{offset}$ is $Q_{offsets,\ n} + Q_{offsetfrequency}$.

The UE ranks all cells that fulfill the S criterion based on ranking values. During reselection, the UE does not simply reselect to a highest ranked cell, but finds a largest ranking value during ranking. When differences between the largest ranking value and ranking values of cells fall within a range, such cells are all considered as similar cells. Among these similar cells, the UE reselects to a cell with a largest quantity of good beams.

It should be understood that parameters configured for a cell on which the UE currently camps and a neighboring cell are broadcast through system information of the cell on which the UE currently camps, so that the UE can obtain parameters such as $R_s$ and $R_n$ through calculation. $Q_{meas}$ represents received signal strength, of a cell, measured by the UE. A maximum of N beams that are of each cell and whose signal strength is higher than a threshold are used to generate cell quality, and cell quality obtained through layer 3 filtering is used as $Q_{meas}$. The threshold and N are notified to the UE through a broadcast message. A beam whose signal strength is higher than the threshold is considered as a good beam. For a high priority frequency or system or for a low priority frequency or system, if a plurality of cells fulfills the condition, ranking needs to be performed on the cells.

A fake base station can transmit a high-power signal to cause UE in an idle state to camp on a fake cell controlled by the fake base station, thus affecting normal service transmission of the UE. Currently, the UE determines, based on ConnEstFailureControl in a SIB1, how to perform cell reselection and select to another cell when RRC setup of the UE keeps failing.

After sending RRCSetupRequest, the UE starts a timer T300. If the UE does not receive an RRC setup message or an RRC reject message from a network device when T300 expires, the UE determines that current RRC setup fails. The UE continues sending RRCSetupRequest to the network device, and repeats the foregoing operations. If a SIB1 includes connEstFailCount information, and a quantity of a T300 record increases by 1 each consecutive time T300 expires, when the quantity of the T300 record reaches or exceeds a preset value (a quantity that is defined in connEstFailCount), the UE determines whether a cell fulfills an S criterion. If the cell does not fulfill the S criterion, cell reselection starts. If the UE receives RRCSetup from a serving cell after sending RRCSetupRequest, the quantity of a T300 record does not increase even without subsequent behaviors such as authentication and security mode activation. In addition, after receiving a new SIB1, the UE deletes an original SIB1.

Currently, the fake base station expects the UE to keep camping on the fake cell controlled by the fake base station. However, the fake base station is incapable of being truly accessed by or connected to the UE. In other words, the fake base station is incapable of enabling the UE to successfully establish an RRC connection. After the fake base station suppresses a legitimate base station, the following operations may be performed to attract the UE as far as possible to camp on the fake cell:

(1) In an existing protocol, when receiving a new SIB1, the UE deletes an original SIB1. Because the fake base station transmits a high-power signal, the UE considers that the cell controlled by the fake base station is a better cell or a more suitable cell. After camping on the cell controlled by the fake base station and receiving a SIB1 sent by the fake base station, the UE deletes a previously stored SIB1. The fake base station may tamper with system information of the cell. The fake base station broadcasts the SIB1, but the broadcast SIB1 does not include ConnEstFailureControl information. Consequently, the UE cannot determine, based on the connEstFailCount, whether a quantity of times T300 expires reaches or exceeds a preset threshold, and cannot reselect to another legitimate cell. Signal quality of the fake cell on which the UE camps remains very good. Even if the UE cannot perform normal communication and cannot reselect to a new cell, the UE remains in the idle state in the fake cell. Consequently, service transmission of the UE is affected. It should be understood that SIB1 broadcast by the fake base station does not include the ConnEstFailure-Control information, and fake base station may not send the ConnEstFailureControl information in another manner.

(2) The fake base station broadcasts the ConnEstFailure-Control information, but the fake base station responds to the RRCSetupRequest message sent by the UE. For example, the fake base station sends an RRC setup message or an RRC reject message. If the fake base station sends the RRC setup message, but the fake base station does not perform subsequent operations, such as subsequent authentication and security mode activation, the RRC connection cannot be truly established. For example, the quantity that is defined in the connEstFailCount in the ConnEstFailureControl information is 5. The UE sends the RRCSetupRequest message four times and does not receive a response message sent by the fake base station for four consecutive times. In this case, the quantity of times T300 expires is also 4. After the UE sends the RRCSetupRequest message a fifth time, the fake base station replies to the UE with a response message. Consequently, the quantity of times T300 expires changes back to 0. The quantity of times T300 expires keeps not exceeding the quantity that is defined in the connEstFail-Count. As a result, the UE cannot determine that establishment of the RRC connection fails. For another example, each time the UE sends the RRCSetupRequest message, the fake base station replies with the RRCReject message or an RRCSetup message. The quantity of times T300 expires keeps not exceeding the quantity that is defined in the connEstFailCount. Consequently, the UE can only keep camping on the fake cell. Because the quantity of consecutive times T300 expires consequently does not reach or exceed the quantity that is defined in the connEstFailCount, the UE cannot trigger a subsequent cell reselection mechanism, and can only keep camping on the fake cell and remain in the idle state. Consequently, service transmission of the UE is affected.

Therefore, embodiments of this application provide a cell reselection method, so that a terminal device camping on a fake cell is triggered to perform cell reselection to access a legitimate cell. In this way, a case in which service transmission is affected because the terminal device camps on the fake cell for a long time is avoided.

If the fake base station does not send ConnEstFailure-Control information, and the terminal device stores Con-nEstFailureControl information sent by a previously accessed legitimate cell, the UE can reselect to another legitimate cell when RRC setup fails.

FIG. 5 is a schematic flowchart of a cell reselection method 500 according to some embodiments of this application.

A first radio access network device and a second radio access network device in some embodiments of this application may be referred to as network devices or base stations. This is not specifically limited in this application.

If a terminal device wants to transition from an RRC idle state to an RRC connected state for data transmission, an RRC signaling transmission channel needs to be established first, and then a data channel is established through exchange of RRC signaling. If the terminal device and a first cell need to establish an RRC signaling transmission channel, the terminal device sends an RRC setup request message to a first radio access network device that controls the first cell, and a timer T300 is started at the same time when the RRC setup request message is sent. If the first radio access network device does not send an RRC setup message or an RRC reject message for the RRC setup request message to the terminal device, T300 consequently expires. If T300 expires, the terminal device determines that current RRC setup fails. Usually, if a request of the terminal device to establish an RRC connection keeps failing, quality of connection between the terminal device and the first cell is relatively poor.

510: The terminal device in the RRC idle state sends the RRC setup request message to the first radio access network device a plurality of times, where the first cell controlled by the first radio access network device is a cell on which the terminal device currently camps.

Before the terminal device accesses the first cell, the terminal device accesses a second cell controlled by a second radio access network device. A SIB1 is broadcast in the second cell, and the SIB1 includes ConnEstFailureControl information. The terminal device receives and stores the ConnEstFailureControl information from the second radio access network device.

For example, when the terminal device is in the RRC idle state or in an RRC inactive state, the terminal device may perform measurement on a current serving cell (the second cell) and a neighboring cell, to perform cell reselection. In other words, while the terminal device already camps on a cell, the terminal device reselects a better cell or a more suitable cell to camp on.

Because the first radio access network device transmits a high-power signal, the terminal device considers that the first cell controlled by the first radio access network device is a better cell or a more suitable cell. As a result, the terminal device accesses the first cell. A SIB1 is broadcast in the first cell, but the broadcast SIB1 does not include ConnEstFailureControl information, which may be understood as that the first radio access network device does not send the ConnEstFailureControl information to the terminal device. The terminal device receives and stores the SIB1 from the first radio access network device.

Optionally, the terminal device does not delete the SIB1 received from the second radio access network device. That is, the terminal device retains the two SIB1s. Alternatively, the terminal device may retain the ConnEstFailureControl information in the SIB1 received in the second cell, and update the ConnEstFailureControl information to the SIB1 received in the first cell.

The ConnEstFailureControl information received from the second radio access network device may be referred to as first configuration information in this application. The first configuration information includes a first preset threshold, a first offset, and a validity period of the first offset. The first preset threshold is a value corresponding to a connEstFailCount. The first offset is a value of $Qoffset_{temp}$ corresponding to a connEstFailOffset applied when the terminal device performs S criterion-based determining on the serving cell. The validity period of the first offset is a time within which the terminal device applies the connEstFailOffsetValidity.

520: The terminal device receives a response message for the sent RRC setup request message within a preset time.

Specifically, each time after sending the RRC setup request message to the first radio access network device, the terminal device starts the timer T300. If the terminal device does not receive the response message from the first radio access network device when T300 expires, the terminal device determines that current RRC connection establishment fails. The response message may be an RRC setup message, or may be an RRC reject message.

530: The terminal device determines, based on the first preset threshold and a quantity of consecutive times that the response message is not received, whether to perform cell reselection, to access another cell. It should be understood that, the quantity of consecutive times that the response message is not received is a quantity of consecutive times a response message that is for the RRC setup request message and that is from the first cell is not received. The first preset threshold is received by the terminal device from the second radio access network device and stored by the terminal device, and the second radio access network device is a radio access network device accessed by the terminal device before the terminal device accesses the first radio access network device. The terminal device does not receive the ConnEstFailureControl information from the first radio access network device. That is, the terminal device does not receive, from the first radio access network device, second configuration information used to determine whether to perform cell reselection.

In some embodiments, if the quantity of consecutive times that the response message for the RRC setup request message is not received is greater than or equal to the first preset threshold, the terminal device determines, depending on whether the first cell fulfills a first criterion, whether to perform cell reselection.

Specifically, the terminal device determines, based on the first configuration information, whether the first cell fulfills the first criterion. It may be understood that the terminal device determines, based on the first offset and the validity period of the first offset in the first configuration information, whether the first cell fulfills the first criterion. The first criterion may be the foregoing S criterion.

Optionally, if the quantity of consecutive times that the response message for the RRC setup request message is not received is greater than or equal to the first preset threshold, and the first cell fulfills the first criterion, the terminal device may decrease a priority of the first cell until the priority of the first cell is lower than a second preset threshold. At this time, the terminal device determines to perform cell reselection. The second preset threshold may be predefined in a protocol, or may be determined by the terminal device. A priority is configured based on a frequency. Cells with different carriers are of different priorities. The priority of the first cell is decreased, so that it can be easier for the terminal device to reselect to another cell whose priority is higher than the priority of the first cell. The terminal device always measures a signal of a high-priority cell. Therefore, if the priority of the first cell is decreased, the terminal device performs measurement on more cells, and a probability of reselecting away from the first cell is higher. Alternatively, the terminal device may directly decrease the priority of the first cell to the lowest priority, so that the terminal device reselects to another cell whose priority is higher than the priority of the first cell.

It should be understood that if the quantity of consecutive times that the response message for the RRC setup request message is not received from the first radio access network device is greater than or equal to the first preset threshold, and the first cell fulfills the first criterion, the terminal device may consider or determine that the first cell is a fake cell and the first radio access network device is a fake base station.

The terminal device excludes the first cell from a candidate cell in a process of performing cell reselection. For example, the terminal device may add the first cell to a blacklist, so that the terminal device no longer considers the first cell when performing cell reselection.

Decreasing the priority of the first cell, or decreasing the priority of the first cell to the lowest priority, or adding the first cell to the blacklist may be performed within a period of time or may be performed a quantity of consecutive times that cell reselection is performed. In other words, the terminal device may decrease the priority of the cell in one or more future cell reselection processes or exclude the first cell from the candidate cell in one or more future cell reselection processes.

Optionally, if the quantity of consecutive times that the response message for the RRC setup request message is not received is greater than or equal to the first preset threshold, and the first cell fulfills the first criterion, the terminal device may increase the first offset. The first offset is used to determine whether the first cell fulfills the first criterion. A greater first offset indicates that it is more difficult for the first cell to fulfill the first criterion. When the first cell does not fulfill the first criterion, the terminal device may determine to perform cell reselection.

When the first criterion is the S criterion, the first offset is the $Qoffset_{temp}$ in Formula (1) and Formula (2). When a value of $Qoffset_{temp}$ is large enough, the first cell no longer fulfills the S criterion. In this case, the terminal device may be triggered to perform cell reselection, and the terminal device may reselect to another legitimate cell.

It should be understood that a process of increasing $Qoffset_{temp}$ and determining whether the first cell fulfills the S criterion may be repeated many times until the first cell does not fulfill the S criterion. A value by which $Qoffset_{temp}$ is increased each time may be fixed, or may be variable. For example, as $Qoffset_{temp}$ is increased more times, $Qoffset_{temp}$ may be increased by a larger value. This is not limited in this application.

Optionally, if the quantity of consecutive times that the response message for the RRC setup request message is not received is greater than or equal to the first preset threshold, and the first cell fulfills the first criterion, the terminal device may decrease a priority of the first cell and increase the first offset. When the priority of the first cell is lower than a second preset threshold and the first cell does not fulfill the first criterion, the terminal device determines to perform cell reselection. For example, when the priority of the first cell is lower than the second preset threshold and the first cell does not fulfill the S criterion, the terminal device determines to perform cell reselection.

For example, if the quantity of consecutive times that the response message for the RRC setup request message is not received is greater than or equal to the first preset threshold, and the first cell does not fulfill the first criterion, the terminal device considers that a state of connection between the terminal device and the first cell is poor, and may perform cell reselection.

In another implementation, if a quantity of times that the timer T300 expires is greater than or equal to the first preset threshold, the terminal device determines to perform cell reselection, to access another cell. It should be understood that, T300 is restarted each time T300 expires, and a quantity of a T300 record increases by 1 each consecutive time T300 expires. When the quantity of a T300 record reaches or exceeds the first preset threshold (a quantity that is defined in connEstFailCount), the terminal device determines to perform cell reselection.

For example, if the quantity of consecutive times that the response message for the RRC setup request message is not received is less than the first preset threshold, the terminal device determines not to perform cell reselection, and still camps on the first cell.

In the technical solutions provided in some embodiments of this application, because the currently accessed first radio access network device does not send the ConnEstFailure-Control information to the terminal device, the terminal device stores ConnEstFailureControl information (the first configuration information) sent by a previously accessed radio access network device, and determines, based on connEstFailCount (the first preset threshold) in the stored ConnEstFailureControl information, whether RRC setup fails and whether to perform cell reselection. If the quantity of consecutive times that the response message for the RRC setup request message is not received is greater than or equal to the first preset threshold, the terminal device may be directly triggered to perform cell reselection, or the terminal device may be triggered, depending on whether the cell on which the terminal device currently camps fulfills the S criterion, to perform cell reselection to access a legitimate cell. In this way, a case in which service transmission is affected because the terminal device camps on a fake cell for a long time is avoided.

FIG. 6 is a schematic flowchart of another cell reselection method 600 according to some embodiments of this application.

A fake base station sends ConnEstFailureControl information to a terminal device, and may set connEstFailCount to a maximum value, or may set connEstFailOffsetValidity to a minimum value, or may set connEstFailOffset to a minimum value, to reduce a probability that the terminal device reselects away from a cell. In addition, the fake base station replies with an RRC setup message or an RRC reject message for each RRC setup request message, so that a timer T300 keeps not expiring. Alternatively, when a quantity of consecutive times T300 expires is about to reach a preset threshold, the fake base station replies to the terminal device with an RRC setup message or an RRC reject message, so that the quantity of times T300 expires is reset. Therefore, a cell reselection mechanism remains untriggered, and consequently the terminal device keeps camping on a fake cell. For example, each time after sending an RRC setup request message, the terminal device receives an RRC reject message within a preset time. In this case, the timer T300 keeps not expiring, the quantity of times T300 expires does not exceed the preset threshold, and the cell reselection mechanism is not triggered. For another example, each time after sending an RRC setup request message, the terminal device receives an RRC setup message within a preset time. Even if the fake base station does not perform subsequent authentication and security mode activation, and consequently data service transmission cannot be performed, the timer T300 keeps not expiring, the quantity of times T300 expires does not exceed the preset threshold, and the cell reselection mechanism is not triggered.

If a quantity of a T300 record does not exceed a quantity that is defined in connEstFailCount because the fake base station sends the ConnEstFailureControl information and the terminal device is replied to with an RRC setup message or an RRC reject message after sending an RRC setup request message, a new timer is configured to record a quantity of times that the terminal device sends the RRC setup request message (initiates RRC setup) or a quantity of times that the terminal device receives a response message for the RRC setup request message. When the quantity exceeds a threshold, cell reselection is performed. The quantity of times that the response message is received may be a quantity of times an RRC setup message is received, may be a quantity of times an RRC reject message is received, or may be a sum of a quantity of times an RRC setup message is received and a quantity of times an RRC reject message is received.

A first radio access network device in some embodiments of this application may be referred to as a network device or a base station. This is not specifically limited in this application.

610: A terminal device in an RRC idle state sends an RRC setup request message to the first radio access network device a plurality of times, where a first cell is a cell on which the terminal device currently camps.

Before the terminal device accesses the first cell, the terminal device accesses a second cell controlled by a second radio access network device. A SIB1 is broadcast in the second cell, and the SIB1 includes ConnEstFailureControl information. The terminal device receives and stores the ConnEstFailureControl information from the second radio access network device. When the terminal device is in the RRC idle state, the terminal device performs measurement on a current serving cell (the second cell) and a neighboring cell, to perform cell reselection. In other words, while the terminal device already camps on a cell, the terminal device reselects a better cell or a more suitable cell to camp on.

Because the first radio access network device transmits a high-power signal, the terminal device considers that the first cell controlled by the first radio access network device is a better cell or a more suitable cell. As a result, the terminal device hands over from the second cell to the first cell. A SIB1 is also broadcast in the first cell, and the broadcast SIB1 includes ConnEstFailureControl information. The terminal device receives and stores the SIB1 from the first radio access network device, and deletes the SIB1 received from the second radio access network device.

The ConnEstFailureControl information received from the first radio access network device may be referred to as second configuration information in this application. The second configuration information includes a fourth preset threshold, a second offset, and a validity period of the second offset. The fourth preset threshold is a value corresponding to a connEstFailCount. The second offset is a value of $Qoffset_{temp}$ corresponding to a connEstFailOffset applied when the terminal device performs S criterion-based determining on the serving cell. The validity period of the second offset is a time within which the terminal device applies the connEstFailOffsetValidity.

620: The terminal device receives a response message for the sent RRC setup request message within a preset time, where the response message may be an RRC setup message, or may be an RRC reject message.

630: The terminal device determines, based on a third preset threshold and a quantity of times that the RRC setup request message is sent or a quantity of times that the response message for the RRC setup request message is received, whether to perform cell reselection, where the response message includes the RRC setup message and/or the RRC reject message. Specifically, the terminal device may be configured with a new counter, and the counter is configured to record the quantity of times that the terminal device sends the RRC setup request message or the quantity of times that the terminal device receives the response message for the RRC setup request message. It should be understood that, the quantity of times that the terminal device sends the RRC setup request message or the quantity of times that the terminal device receives the response message for the RRC setup request message is cumulatively calculated. For example, the response message may be consecutively received, or may be non-consecutively received.

For example, if the first radio access network device keeps sending the RRC reject message for the RRC setup request message, the terminal device needs to record only a quantity of times that the RRC reject message is received; if the first radio access network device keeps sending the RRC setup message for the RRC setup request message, the terminal device needs to record only a quantity of times that the RRC setup message is received; or if the first radio access network device alternately sends the RRC reject message and the RRC setup message for the RRC setup request message, the terminal device may record a sum of a quantity of times that the RRC reject message is received and a quantity of times that the RRC setup message is received.

Optionally, the third preset threshold may be predefined in a protocol, or the third preset threshold may be determined by the terminal device, or the third preset threshold may be received by the terminal device from the first radio access network device or the second radio access network device. The second radio access network device is a radio access network device accessed by the terminal device before the terminal device accesses the first radio access network device. If the third preset threshold is received by the terminal device from the first radio access network device or the second radio access network device, the first radio access network device or the second radio access network device may send the third preset threshold in a broadcast or unicast manner. The third preset threshold may be included in the ConnEstFailureControl of the SIB1, or may be sent in another manner.

In some embodiments, if the quantity of times that the RRC setup request message is sent or the quantity of times that the response message is received is greater than or equal to the third preset threshold, the terminal device determines, depending on whether the first cell controlled by the first radio access network device fulfills the first criterion, whether to perform cell reselection.

In some embodiments, if the quantity of times that the RRC setup request message is sent or the quantity of times that the response message is received is greater than or equal to the third preset threshold, the terminal device determines, based on the second configuration information, whether the first cell fulfills the first criterion. It may be understood that the terminal device determines, based on the second offset and the validity period of the second offset in the second configuration information, whether the first cell fulfills the first criterion. The first criterion may be the foregoing S criterion.

Optionally, if the quantity of times that the RRC setup request message is sent or the quantity of times that the response message is received is greater than or equal to the third preset threshold, and the first cell fulfills the first criterion, the terminal device may decrease a priority of the first cell until the priority of the first cell is lower than a second preset threshold. At this time, the terminal device determines to perform cell reselection. The second preset threshold may be predefined. A priority is configured based on a frequency. Cells with different carriers are of different priorities. The priority of the first cell is decreased, so that it can be easier for the terminal device to reselect to another cell whose priority is higher than the priority of the first cell. The terminal device always measures a signal of a high-priority cell. Therefore, if the priority of the first cell is decreased, the terminal device performs measurement on more cells, and a probability of reselecting away from the first cell is higher. Alternatively, the terminal device may directly decrease the priority of the first cell to the lowest priority, so that the terminal device reselects another cell whose priority is higher than the priority of the first cell.

It should be understood that if the quantity of times that the RRC setup request message is sent or the quantity of times that the response message is received is greater than or equal to the third preset threshold, and the first cell fulfills the first criterion, the terminal device may consider or determine that the first cell is a fake cell and the first radio access network device is a fake base station.

The terminal device excludes the first cell from a candidate cell in a process of performing cell reselection. For example, the terminal device may add the first cell to a blacklist, so that the terminal device no longer considers the first cell when performing cell reselection. Decreasing the priority of the first cell, or decreasing the priority of the first cell to the lowest priority, or adding the first cell to the blacklist may be performed within a period of time or may be performed during a time within which cell reselection is performed several consecutive times. In other words, the terminal device may decrease the priority of the cell in one or more future cell reselection processes or exclude the first cell from the candidate cell in one or more future cell reselection processes.

Optionally, if the quantity of times that the RRC setup request message is sent or the quantity of times that the response message is received is greater than or equal to the third preset threshold, and the first cell fulfills the first criterion, the terminal device may increase the second offset. The second offset is used to determine whether the first cell fulfills the first criterion. A larger second offset indicates that it is more difficult for the first cell to fulfill the first criterion. When the first cell does not fulfill the first criterion, the terminal device may determine to perform cell reselection.

When the first criterion is the S criterion, the second offset is the $Qoffset_{temp}$ in Formula (1) and Formula (2). When a value of $Qoffset_{temp}$ is large enough, the first cell no longer fulfills the S criterion. In this case, the terminal device may be triggered to perform cell reselection, and the terminal device may reselect to another legitimate cell.

It should be understood that a process of increasing $Qoffset_{temp}$ and determining whether the first cell fulfills the S criterion may be repeated a plurality of times until the first cell does not fulfill the S criterion. A value by which $Qoffset_{temp}$ is increased each time may be fixed, or may be variable. For example, as $Qoffset_{temp}$ is increased more times, $Qoffset_{temp}$ may be increased by a larger value. This is not limited in this application.

Optionally, if the quantity of times that the RRC setup request message is sent or the quantity of times that the response message is received is greater than or equal to the third preset threshold, and the first cell fulfills the first criterion, the terminal device may decrease a priority of the first cell and increase the second offset. When the priority of the first cell is lower than a second preset threshold and the first cell does not fulfill the first criterion, the terminal device determines to perform cell reselection. For example, when the priority of the first cell is lower than the second preset threshold and the first cell does not fulfill the S criterion, the terminal device determines to perform cell reselection.

For example, if the quantity of times that the RRC setup request message is sent or the quantity of times that the response message is received is greater than or equal to the third preset threshold, and the first cell does not fulfill the first criterion, the terminal device considers that a state of connection between the terminal device and the first cell is poor, and may perform cell reselection.

In another implementation, if the quantity of times that the RRC setup request message is sent or the quantity of times that the response message is received is greater than or equal to the third preset threshold, the terminal device determines to perform cell reselection, to access another cell.

Specifically, if the quantity of times that the RRC setup request message is sent is greater than or equal to the third preset threshold, the terminal device determines to perform cell reselection; if the quantity of times that the RRC setup message is received is greater than or equal to the third preset threshold, the terminal device determines to perform cell reselection; if the quantity of times that the RRC reject message is received is greater than or equal to the third preset threshold, the terminal device determines to perform cell reselection; or if the sum of the quantity of times the RRC setup message is received and the quantity of times the RRC reject message is received is greater than or equal to the third preset threshold, the terminal device determines to perform cell reselection.

For example, if the quantity of times that the RRC setup request message is sent or the quantity of times that the response message is received is less than the third preset threshold, the terminal device determines not to perform cell reselection, and still camps on the first cell.

Specifically, if the quantity of times that the RRC setup request message is sent is less than the third preset threshold, the terminal device determines not to perform cell reselection; if the quantity of times that the RRC setup message is received is less than the third preset threshold, the terminal device determines not to perform cell reselection; if the quantity of times that the RRC reject message is received is less than the third preset threshold, the terminal device determines not to perform cell reselection; or if a quantity of times that the RRC setup message and the RRC reject message are received is less than the third preset threshold, the terminal device determines not to perform cell reselection.

In the technical solutions provided in some embodiments of this application, because the currently accessed first radio access network device replies to the RRC setup request message with the RRC setup message or the RRC reject message, and therefore a quantity of consecutive times that the response message for the RRC setup request message is not received does not exceed the fourth preset threshold, the terminal device determines, based on the third preset threshold and the cumulative quantity of times that the RRC setup request message is sent or the cumulative quantity of times that the response message is received, whether RRC setup fails and whether to perform cell reselection. If the quantity of times that the RRC setup request message is sent or the quantity of times that the response message is received is greater than or equal to the third preset threshold, the terminal device may be directly triggered to perform cell reselection, or the terminal device may be triggered, depending on whether a cell on which the terminal device currently camps fulfills the S criterion, to perform cell reselection to access a legitimate cell. In this way, a case in which service transmission is affected because the terminal device camps on a fake cell for a long time is avoided.

Some embodiments of this application provide a communication apparatus. FIG. 7 is a schematic block diagram of a communication apparatus 700 according to some embodiments of this application. The apparatus may be used in the terminal device in embodiments of this application. The communication apparatus 700 includes:

a transceiver unit 710, configured to send a radio resource control RRC setup request message to a first radio access network device a plurality of times, where the transceiver unit 710 is further configured to receive a response message for the RRC setup request message within a preset time; and a determining unit 720, configured to determine, based on a first preset threshold and a quantity of consecutive times that the response message is not received, whether to perform cell reselection, where the first preset threshold is received by the terminal device from a second radio access network device and stored by the terminal device, and the second radio access network device is a radio access network device accessed by the terminal device before the terminal device accesses the first radio access network device.

Optionally, the transceiver unit 710 does not receive second configuration information from the first radio access network device, and the second configuration information is used to determine whether to perform cell reselection.

Optionally, the determining unit 720 is configured to:

if the quantity of consecutive times that the response message is not received is greater than or equal to the first preset threshold, determine, depending on whether a first cell controlled by the first radio access network device fulfills a first criterion, whether to perform cell reselection; or if the quantity of consecutive times that the response message is not received is less than the first preset threshold, determine not to perform cell reselection.

Optionally, the determining unit 720 is configured to:

determine, based on first configuration information, whether the first cell fulfills the first criterion, where the first configuration information is received by the transceiver unit 710 from the second radio access network device and stored by the transceiver unit 710, and the first configuration information includes a first offset and a validity period of the first offset;

if the first cell fulfills the first criterion, decrease a priority of the first cell and/or increase the first offset; and when the priority of the first cell is lower than a second preset threshold and/or the first cell does not fulfill the first criterion, the determining unit 720 determines to perform cell reselection.

Optionally, the first criterion includes an S criterion, and the first offset is an offset temporarily applied in the S criterion.

Optionally, the determining unit 720 is configured to:

if the quantity of consecutive times that the response message is not received is greater than or equal to the first preset threshold, determine to perform cell reselection; or if the quantity of consecutive times that the response message is not received is less than the first preset threshold, determine not to perform cell reselection.

Optionally, the determining unit 720 is further configured to exclude the first cell from a candidate cell in a process of performing cell reselection.

Figure 8:
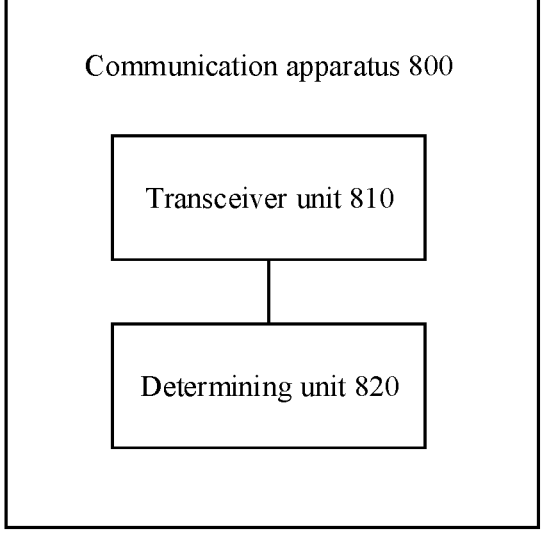
FIG. 8 is a schematic block diagram of another communication apparatus according to some embodiments of this application.

Some embodiments of this application provides another communication apparatus. FIG. 8 is a schematic block diagram of a communication apparatus 800 according to some embodiments of this application. The apparatus may be used in the terminal device in embodiments of this application. The communication apparatus 800 includes:

a transceiver unit 810, configured to send a radio resource control RRC setup request message to a first radio access network device a plurality of times, where the transceiver unit 810 is further configured to receive a response message for the RRC setup request message within a preset time; and a determining unit 820, configured to determine, based on a third preset threshold and a quantity of times that the RRC setup request message is sent or a quantity of times that the response message is received, whether to perform cell reselection.

Optionally, the third preset threshold is predefined in a protocol, or the third preset threshold is determined by the terminal device, or the third preset threshold is received by the terminal device from the first radio access network device or a second radio access network device, where the second radio access network device is a radio access network device accessed by the terminal device before the terminal device accesses the first radio access network device.

Optionally, the determining unit 820 is configured to:

if the quantity of times that the RRC setup request message is sent or the quantity of times that the response message is received is greater than or equal to the third preset threshold, determine, depending on whether a first cell controlled by the first radio access network device fulfills a first criterion, whether to perform cell reselection; or if the quantity of times that the RRC setup request message is sent or the quantity of times that the response message is received is less than the third preset threshold, determine not to perform cell reselection.

Optionally, the determining unit 820 is configured to:

the determining unit 820 determines, based on second configuration information, whether the first cell fulfills the first criterion, where the second configuration information is received by the transceiver unit from the first radio access network device, and the second configuration information includes a second offset and a validity period of the second offset;

if the first cell fulfills the first criterion, the determining unit 820 decreases a priority of the first cell and/or increases the second offset; and when the priority of the first cell is lower than the second preset threshold and/or the first cell does not fulfill the first criterion, the determining unit 820 determines to perform cell reselection.

Optionally, the first criterion includes an S criterion, and the second offset is an offset temporarily applied in the S criterion.

Optionally, the determining unit 820 is configured to:

if the quantity of times that the RRC setup request message is sent or the quantity of times that the response message is received is greater than or equal to the third preset threshold, determine to perform cell reselection; or if the quantity of times that the RRC setup request message is sent or the quantity of times that the response message is received is less than the third preset threshold, determine not to perform cell reselection.

Optionally, the determining unit 820 is further configured to exclude the first cell from a candidate cell in a process of performing cell reselection.

Optionally, the response message includes an RRC setup message and/or an RRC reject message.

Figure 9:
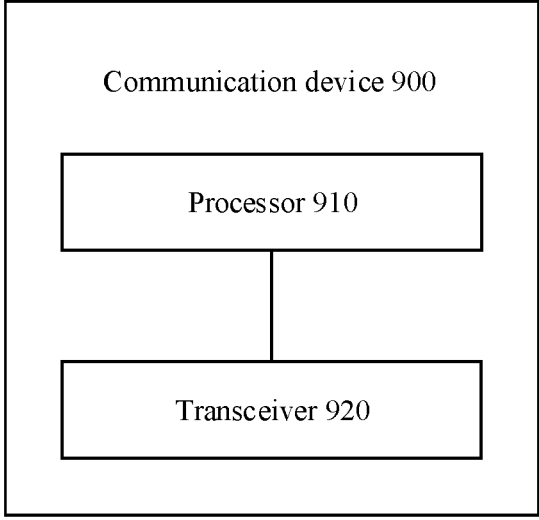
FIG. 9 is a schematic block diagram of a communication device according to some embodiments of this application.

Some embodiments of this application provides a communication device 900. FIG. 9 is a schematic block diagram of the communication device 900 according to some embodiments of this application.

The communication device 900 includes a processor 910 and a transceiver 920. The transceiver 920 is configured to receive computer code or instructions, and transmit the computer code or the instructions to the processor 910. The processor 910 runs the computer code or the instructions, to implement the methods in embodiments of this application. The communication device may be the terminal device in embodiments of this application.

The foregoing processor 910 may be an integrated circuit chip, and has a signal processing capability. In some embodiments, the steps in the method embodiments may be implemented through an integrated logic circuit in the form of hardware in the processor or through instructions in the form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be performed by a hardware decoding processor, or may be performed by using a combination of hardware in the decoding processor and a software module. The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

Some embodiments of this application further provides a computer-readable storage medium. The computer-readable storage medium stores a computer program used to implement the methods in the foregoing method embodiments. When the computer program is run on a computer, the computer is enabled to implement the methods in the foregoing method embodiments.

Some embodiments of this application further provides a computer program product. The computer program product includes computer program code. When the computer program code is run on a computer, the methods in the foregoing method embodiments are performed.

Some embodiments of this application further provides a chip, including a processor, where the processor is connected to a memory, the memory is configured to store a computer program, and the processor is configured to execute the computer program stored in the memory, to enable the chip to perform the methods in the foregoing method embodiments.

It should be understood that, in embodiments of this application, numbers "first", "second", and the like are merely used to distinguish between different objects, for example, to distinguish between different radio access network devices or different cells, and do not constitute a limitation on the scope of embodiments of this application. Embodiments of this application are not limited thereto.

The term "and/or" in this application describes only an association relationship for describing associated objects and indicates that three relationships may exist. For example, A and/or B may indicate the following three cases: Only A exists, both A and B exist, and only B exists. In addition, the character "/" in this specification usually indicates an "or" relationship between associated objects. In this application, the term "at least one" may indicate "one" or "two or more". For example, at least one of A, B, and C may indicate the following seven cases: Only A exists, only B exists, only C exists, both A and B exist, both A and C exist, and both C and B exist, and A, B, C all exist.

A person of ordinary skill in the art may be aware that, the units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each application, but such implementation should not be considered beyond the scope of this application.

It may be clearly understood by the person skilled in the art that, for ease of brief description, for detailed working processes of the foregoing apparatuses and units, refer to corresponding processes in the foregoing method embodiments, and details are not described herein again.

In several embodiments provided in this application, it should be understood that the disclosed apparatuses and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technologies, or some of the technical solutions may be implemented in a form of computer software product. The computer software product is stored in a storage medium, and includes several instructions for indicating a computing device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely some implementations of this application, but the protection scope of this application is not limited thereto. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A cell reselection method, comprising:

sending a radio resource control (RRC) setup request message to a first radio access network device a plurality of times;

determining, based on a first preset threshold and a quantity of consecutive times that a response message is not received within a preset time of the RRC setup request message, whether to perform cell reselection, or determining, based on a third preset threshold and a quantity of times that the RRC setup request message is sent or a quantity of times that the response message is received within the preset time of the RRC setup request message, whether to perform cell reselection, wherein the first preset threshold is received from a second radio access network device and stored, and the second radio access network device is a radio access network device accessed by a terminal device before the terminal device accesses the first radio access network device.

2. The method according to claim 1, wherein second configuration information is not received from the first radio access network device, and the second configuration information is used to determine whether to perform cell reselection.

3. The method according to claim 1, wherein the determining, based on the first preset threshold and the quantity of consecutive times that the response message is not received, whether to perform cell reselection comprises:

if the quantity of consecutive times that the response message is not received is greater than or equal to the first preset threshold, determining, depending on whether a first cell controlled by the first radio access network device fulfills a first criterion, whether to perform cell reselection; or if the quantity of consecutive times that the response message is not received is less than the first preset threshold, determining not to perform cell reselection.

4. The method according to claim 3, wherein the determining, depending on whether the first cell controlled by the first radio access network device fulfills the first criterion, whether to perform cell reselection comprises:

determining, based on first configuration information, whether the first cell fulfills the first criterion, wherein the first configuration information is received from the second radio access network device and stored, and the first configuration information comprises a first offset and a validity period of the first offset;

if the first cell fulfills the first criterion, decreasing a priority of the first cell and/or increasing the first offset; and when the priority of the first cell is lower than a second preset threshold and/or the first cell does not fulfill the first criterion, determining to perform cell reselection.

5. The method according to claim 4, wherein the first criterion comprises an S criterion, and the first offset is an offset temporarily applied in the S criterion.

6. The method according to claim 1, wherein the determining, based on the first preset threshold and the quantity of consecutive times that the response message is not received, whether to perform cell reselection comprises:

if the quantity of consecutive times that the response message is not received is greater than or equal to the first preset threshold, determining to perform cell reselection; or if the quantity of consecutive times that the response message is not received is less than the first preset threshold, determining not to perform cell reselection.

7. The method according to claim 1, wherein the third preset threshold is predefined in a protocol, or the third preset threshold is determined by the terminal device, or the third preset threshold is received from the first radio access network device or the second radio access network device.

8. The method according to claim 1, wherein the determining, based on the third preset threshold and the quantity of times that the RRC setup request message is sent or the quantity of times that the response message is received, whether to perform cell reselection comprises:

if the quantity of times that the RRC setup request message is sent or the quantity of times that the response message is received is greater than or equal to the third preset threshold, determining, depending on whether a first cell controlled by the first radio access network device fulfills a first criterion, whether to perform cell reselection; or if the quantity of times that the RRC setup request message is sent or the quantity of times that the response message is received is less than the third preset threshold, determining not to perform cell reselection.

9. The method according to claim 8, wherein the determining, depending on whether the first cell controlled by the first radio access network device fulfills the first criterion, whether to perform cell reselection comprises:

determining, based on second configuration information, whether the first cell fulfills the first criterion, wherein the second configuration information is received from the first radio access network device, and the second configuration information comprises a second offset and a validity period of the second offset;

if the first cell fulfills the first criterion, decreasing a priority of the first cell and/or increasing the second offset; and when the priority of the first cell is lower than the second preset threshold and/or the first cell does not fulfill the first criterion, determining to perform cell reselection.

10. The method according to claim 9, wherein the first criterion comprises an S criterion, and the second offset is an offset temporarily applied in the S criterion.

11. The method according to claim 1, wherein the determining, based on the third preset threshold and the quantity of times that the RRC setup request message is sent or the quantity of times that the response message is received, whether to perform cell reselection comprises:

if the quantity of times that the RRC setup request message is sent or the quantity of times that the response message is received is greater than or equal to the third preset threshold, determining to perform cell reselection; or if the quantity of times that the RRC setup request message is sent or the quantity of times that the response message is received is less than the third preset threshold, determining not to perform cell reselection.

12. The method according to claim 3, wherein the method further comprises:

excluding the first cell from a candidate cell in a process of performing cell reselection.

13. The method according to claim 6, wherein the response message comprises an RRC setup message and/or an RRC reject message.

14. A communication apparatus, comprising at least one circuitry configured to:

send a radio resource control (RRC) setup request message to a first radio access network device a plurality of times, determine, based on a first preset threshold and a quantity of consecutive times that a response message is not received within a preset time of the RRC setup request message, whether to perform cell reselection, or determine, based on a third preset threshold and a quantity of times that the RRC setup request message is sent or a quantity of times that the response message is received within the preset time of the RRC setup request message, whether to perform cell reselection, wherein the first preset threshold is received from a second radio access network device and stored, and the second radio access network device is a radio access network device accessed by a terminal device before the terminal device accesses the first radio access network device.

15. The apparatus according to claim 14, wherein second configuration information is received from the first radio access network device, and the second configuration information is used to determine whether to perform cell reselection.

16. The apparatus according to claim 14, wherein the apparatus is further configured to:

if the quantity of consecutive times that the response message is not received is greater than or equal to the first preset threshold, determine, depending on whether a first cell controlled by the first radio access network device fulfills a first criterion, whether to perform cell reselection; or if the quantity of consecutive times that the response message is not received is less than the first preset threshold, determine not to perform cell reselection.

17. The apparatus according to claim 16, wherein the apparatus is further configured to:

determine, based on first configuration information, whether the first cell fulfills the first criterion, wherein the first configuration information is received from the second radio access network device and stored, and the first configuration information comprises a first offset and a validity period of the first offset;

if the first cell fulfills the first criterion, decrease a priority of the first cell and/or increase the first offset; and when the priority of the first cell is lower than a second preset threshold and/or the first cell does not fulfill the first criterion, determine to perform cell reselection.

18. The apparatus according to claim 17, wherein the first criterion comprises an S criterion, and the first offset is an offset temporarily applied in the S criterion.

19. The apparatus according to claim 14, wherein the apparatus is further configured to:

if the quantity of consecutive times that the response message is not received is greater than or equal to the first preset threshold, determine to perform cell reselection; or if the quantity of consecutive times that the response message is not received is less than the first preset threshold, determine not to perform cell reselection.

20. The apparatus according to claim 16, wherein the apparatus is further configured to exclude the first cell from a candidate cell in a process of performing cell reselection.

* * * * *